4 Sheets--Sheet 1.

J. W. STOCKWELL.
Improvement in Machines for Manufacture of Pipe, Artificial Stone, &c.

No. 130,252.

Patented Aug. 6, 1872.

Witnesses:
D. W. Scribner
F. E. Jordan

Inventor:
John W. Stockwell
Per Kim Henry Clifford
atty.

AM. PHOTO-LITHOGRAPHIC CO. N.Y. (OSBORNE'S PROCESS)

J. W. STOCKWELL.
Improvement in Machines for Manufacture of Pipe,
Artificial Stone, &c.

No. 130,252.

4 Sheets--Sheet 2.

Patented Aug. 6, 1872.

Witnesses:
D. W. Scribner.
T. E. Jordan.

Inventor:
John W. Stockwell
Per Atty. Wm H Clifford

AM. PHOTO-LITHOGRAPHIC CO. N.Y. (OSBORNE'S PROCESS.)

J. W. STOCKWELL.
Improvement in Machines for Manufacture of Pipe,
Artificial Stone, &c.

No. 130,252.　　　　　　　　　　Patented Aug. 6, 1872.

Witnesses:　　　　　　　　　　　Inventor:
D. W. Scribner,　　　　　　　　　John W. Stockwell
F. E. Jordan　　　　　　　　　　Per Atty Wm Henry Clifford J. W. STOCKWELL.
Improvement in Machines for Manufacture of Pipe, Artificial Stone, &c.

No. 130,252. Patented Aug. 6, 1872.

4 Sheets--Sheet 4.

Witnesses:
D. W. Scribner
F. E. Jordan

Inventor:
John W. Stockwell
Per Wm. Henry Clifford
Atty

UNITED STATES PATENT OFFICE.

JOHN W. STOCKWELL, OF PORTLAND, MAINE.

IMPROVEMENT IN MACHINES FOR THE MANUFACTURE OF PIPE, ARTIFICIAL STONE, &c.

Specification forming part of Letters Patent No. 130,252, dated August 6, 1872.

*To whom it may concern:*

Be it known that I, JOHN W. STOCKWELL, of Portland, in the county of Cumberland and State of Maine, have invented a new and useful Machine for the Manufacture of Pipe, Artificial Stone, &c., of regular and irregular forms; and I hereby declare the following to be a full, clear, and exact description of the same, reference being had to the accompanying drawing, which is hereby made a part of this specification, in which—

Figure 1:
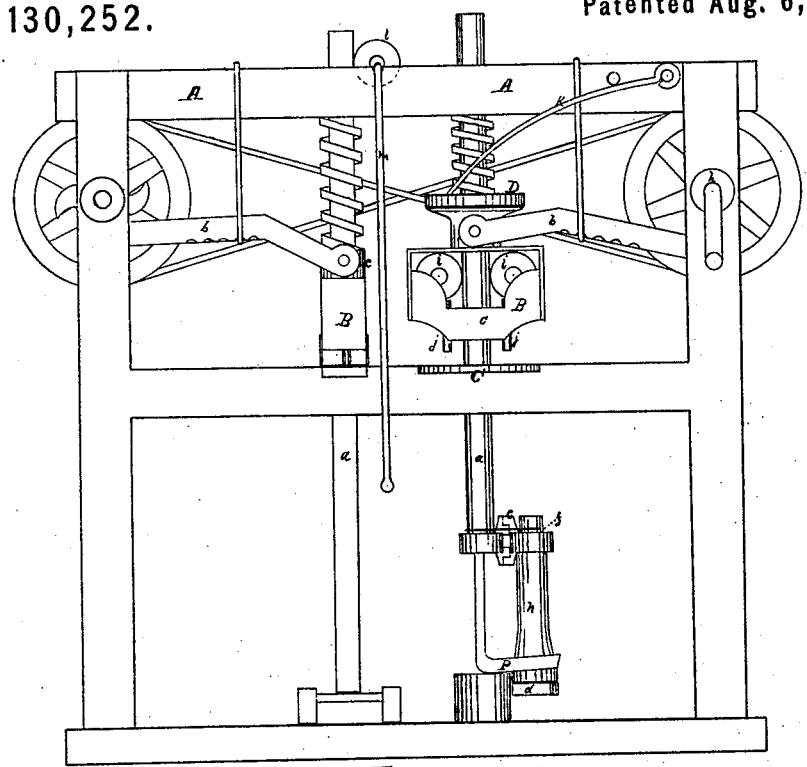
Figure 2:
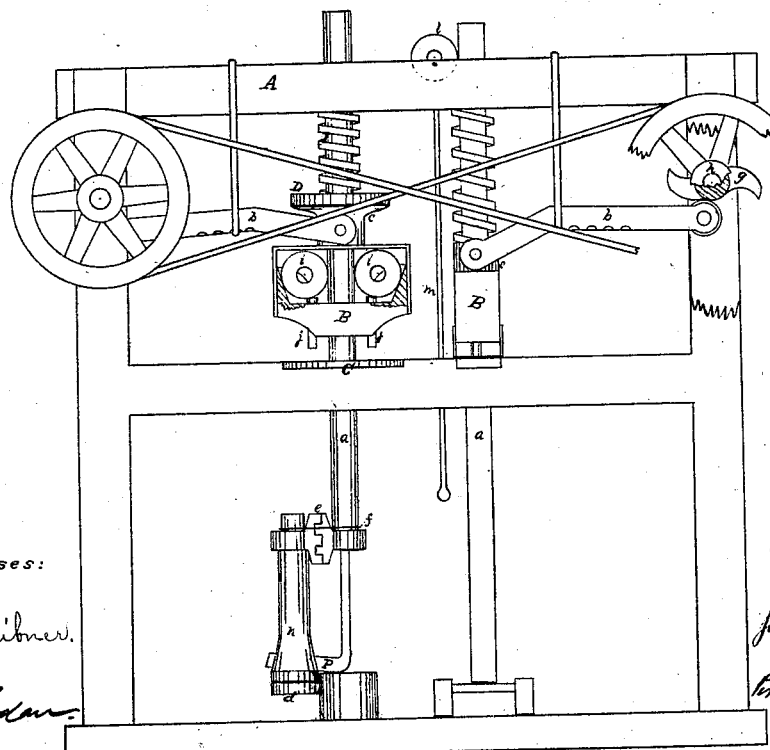
Figure 3:
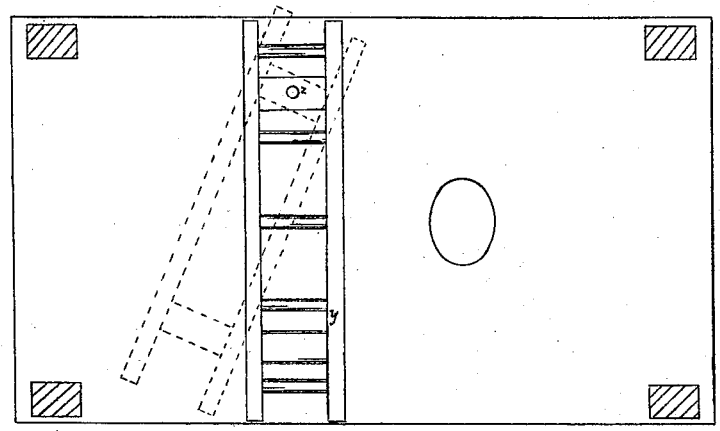
Figure 4:
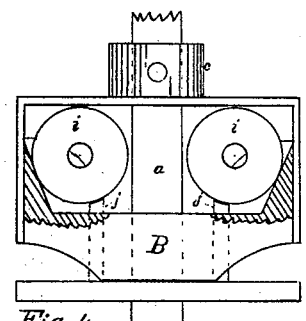
Figure 5:
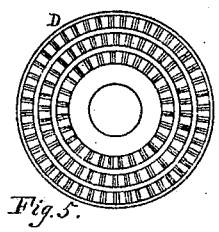
Figure 6:
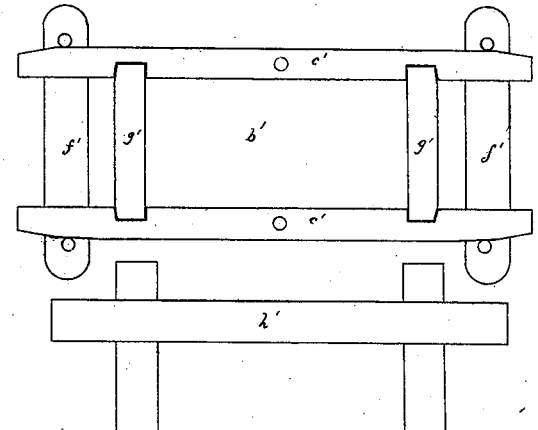
Figure 7:
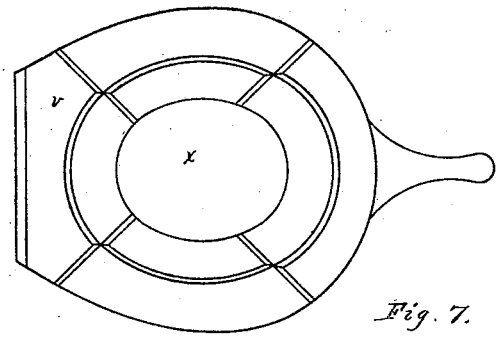
Figure 7:
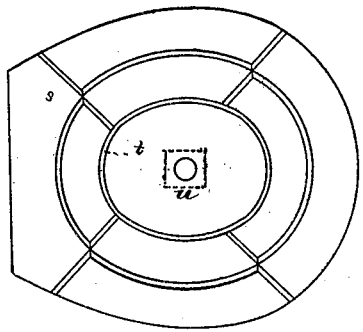
Figure 8:
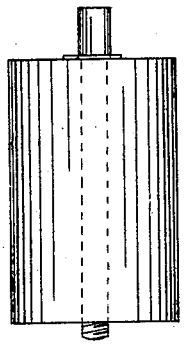
Figure 9:
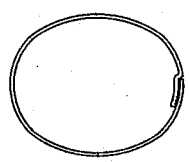
Figure 10:
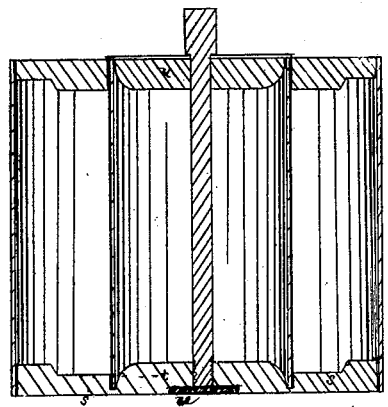
Figure 11:
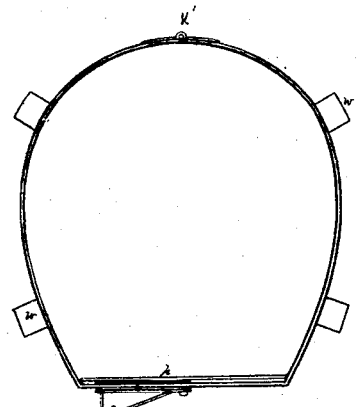
Figure 12:
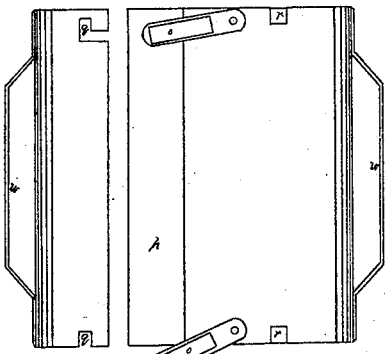
Figure 13:
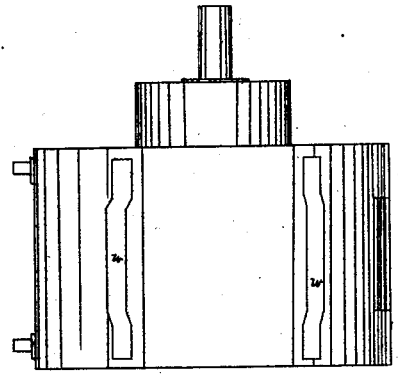
Figure 14:
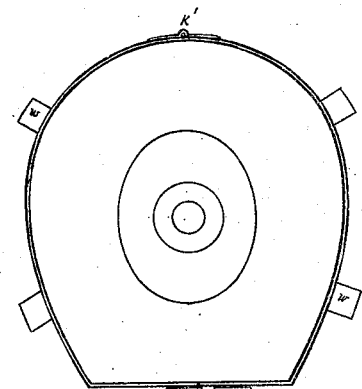
Figure 15:
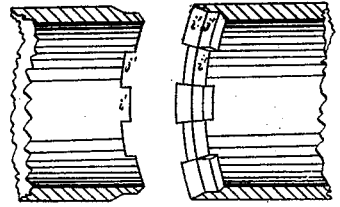

Figure 1 is a side elevation. Fig. 2 is an opposite side elevation. Fig. 3 is a plan view of the bed, showing the adjustable rack for holding the mold. Fig. 4 is a detail of the devices for holding the tamper for making stone; Fig. 5, the adjustable feed for making pipe—top view. Fig. 6 is a view of the mold for making building-stone from cement; Fig. 7, view of operating-faces of joint formers or molds; Fig. 8, side elevation and end view of core; Fig. 9, edge view of the top of core and rod to secure the core to the bottom joint-forming mold; Fig. 10, section view of core as attached to bottom joint-forming mold; Fig. 11, top-edge view of core; Fig. 12, side elevation of same, showing handles and method of fastening; Fig. 13, side elevation of mold and core combined; Fig. 14, top plan of same; Fig. 15, shows my improved pipe-joint.

Same letters show like parts.

I will first take up that modification of my machine to be used for the production of artificial stone, drain, water, and other kinds of pipe. It will be perceived that I use a pounding or percussive machine. Old hand-tamping was objectionable, because it did not make the pipe of an even density. The workman struck harder at one time than he did at another, or he struck more blows at a certain point in the pipe than at others, so that the pipe when made was of varying density.

My invention relates to a machine for producing artificial-stone pipe, hereinafter described, in the manner set forth, the same principles contained therein being, by mechanical arrangements and adaptations, applicable to a variety of useful purposes. I further desire to state at the outset that my machine admits of the making of oval pipes by a rotary process—a step in this art which has been heretofore, to say the least, very difficult to accomplish by any of the previously-known methods.

I will now proceed with a more particular description of my machine. The shaft $a$ is raised, in order to be dropped to produce the blow on the material to be compacted, by the horizontal arm $b$ jointed to a sleeve, $c$, through which the shaft $a$ passes, so as to admit of the turning of the shaft $a$ on its own axis. This turning is to admit of the proper turning of the tamping devices below around the core, which said tamping devices are attached to the lower end of the rod $a$ and consist of the broad foot or hammer $d$, before alluded to, the jointed arm $e$ with the spring $f$, (which may sometimes be dispensed with,) and the shank which connects the hammer with the jointed arm $e$. The sleeve $c$ is prevented from rising up on the shaft $a$ by being connected with the device B, hereinafter more fully described. The horizontal arm $b$ is suspended from the frame A by rods or links, or any other convenient device, its fulcrum or point of suspension being made movable, thus changing the relative lengths of the arms of the lever, and as a consequence changing the degree of intensity with which the blow is struck. It is operated from its outer end by the cam $g$ upon the shaft $h$, which, in turn, may have its power communicated to it in any of the usual modes, (one-half a horse-power being sufficient for all ordinary purposes.) Two cams, as shown, or a less or greater number, may be used to regulate the number of blows struck at each revolution of the shaft $h$. These cams push down the outer end of the arm $b$, by this means lifting the device B with its attachments, and then allowing it to drop when the point of the cam has passed the end of the said lever $b$. Within the device B are seen the two loose rollers or trucks $i\ i$ and the two short pins $j\ j$, standing vertically in the lower part of the box or cavity in the device B. C is a bed or plate for the device B to strike on when the shaft $a$ descends. It will be perceived that the shaft $a$ can be pushed up through the bed C, device B, and sleeve $c$, when desired, it passing upward through them all easily. It will also be seen that if the device B is sufficiently raised from the bed C so that the pins $j j$ do not rest on the bed C, the two wheels or rolls $i i$ will bind and hold the shaft $a$ at any elevation until the device B is again dropped to the bed C, when the pins $j j$, being pushed up in contact with the rolls $i i$, will throw them up, and so release the shaft $a$ from them, and allow it to drop until the lower end strikes some resistance sufficient to sustain the force of the falling shaft. Where it is desirable that the shaft $a$ have a rotary motion it is most convenient to place the pins $j j$ in the device B instead of fixing them upon the bed C, and they are found to perform their office of tripping the rollers $i i$ equally well in either position.

Thus, by means of the above-described mechanism, blows having the same force can be struck by the shaft $a$, which may be of any length desired, when grasped by the rolls $i i$ at any point in its whole length, as the cement or artificial-stone composition rises up by being fed into the case—or, in other words, as the joint of pipe is made. It will be seen that when the shaft $a$ is once pushed up to any extent, as long as it is held while being raised to strike a blow, it is thus held by the two rolls $i i$. These rolls being on two planes inclined downward toward the center of the shaft $a$, and within the device B, they instantly move inward and downward when the pins $j j$ fail to raise them up or push them back by reason of striking on the bed C. It will be seen that the device B descends with the shaft $a$, when a blow is struck, until it approaches so near the plate C that the pins $j j$ operate upon the rolls $i i$, when the shaft $a$ proceeds downward independently from that point, as before intimated. Thus a device is furnished by means of which blows of equal force are struck upon all parts of a joint of pipe, however varying in size, during the progress of its being formed.

When a rotary movement is desired to the shaft $a$ it may be derived from a circular plate, as shown at D, having upon its upper surface grooves, notches, teeth, or any other similar device, and operated by the pawl or arm $k$, which plate is connected with the sleeve $c$ and device B, so that when said plate turns it turns with it the device B and the shaft $a$, held between the rolls or cams in said device.

At the top of the frame A, and beside the shaft $a$, the cam or roll $l$ is placed with the handle $m$ connected therewith, passing downward into easy reach of the hand of the operator. When the shaft $a$ is desired to make the transition from a lower to a higher blow, by pulling down on the handle $m$, the roll $l$ is pressed against the said shaft $a$, and by its operation prevents the shaft $a$ from going downward, and at the same time it is free to move upward; then, by the action of the lever $b$, the shaft $a$ is raised to any desired height, and then, released from the cam $l$, goes on striking its blows, as before. As the plate D is lifted by the arm $b$ the before-described feed-plate is pushed around by the pawl $k$.

Several circles of notches, of different diameters, into any one of which the pawl $k$ can be dropped, will give differing rapidities to the turning of the shaft $a$.

At the lower end of the shaft $a$ is the tamping device $n$, hinged or jointed to the shaft $a$ at $e$. A spring, $f$, tends to draw the tamping device $n$ as near the center as possible, or, in other words, to close the hinge $e$. This spring $f$ will keep the tamper close to the core, which forms the aperture of the pipe. It will thus be seen that the tamping device will travel around a cylindrical or other shaped core with equal exactness, and so tamp or compact the materials of a pipe of any desired form. P shows a scraper, to revolve on the top end of the core, and push off the material placed there into the space between the case and core. This is made to extend up into the shaft so as to be long enough to reach the top of the core at any probable distance that the lower end of the shaft would be above the top of the case.

I will now proceed to describe the case and mold, the former of which is used for the manufacture of pipe, and the latter for making building-blocks of artificial stone. The case may be of any shape conforming to the desired shape of the pipe, and is provided on the outside with the handles $w w$, which are of a length corresponding to that of the case upon which they are used, for convenience of handling in different positions, and also the plate $p$.

The peculiar form of hinge $k$, upon which the two parts of the case turn, I do not claim as new, as I am aware of their general use in various ways heretofore, but I find them peculiarly adaptable to this use, as they prevent the exudation of the material from within the case. As applied here it may be made either of pieces of metal and a central pin or shaft, upon which they turn, or of portions of the material of the case itself, turned or bent around the said central pin, but, in either case, the whole of the contiguous edges of the case must be included in the hinge $k$, to secure the before-mentioned object.

The latches which secure the case when closed, and which may be used alike upon the exterior of the case or upon the interior of the core, are of the form shown at $o$, being bifurcated, the interior part passing between the outer shell or skin of the case and the plate $p$, before mentioned, and the outer part of the latch passing outside of said outer shell, thus securing the opposing edge of the case firmly against the edge carrying the latches, said opposing edge being furnished with the slots $q q$ to contain and hold the latch, and the slots $r r$ are cut in the other edge to receive the latches when unfastened and turned back, so that the case when open may set fairly down without any hindrance from the latches.

At the bottom of the case is placed the joint-former s, having about its center the cavity t for receiving and expanding the core, and at the center of said joint-former is the small metal plate u, in which is cut a hole having a thread corresponding to, and for the reception of, the thread on the rod, seen in Fig. 9, when screwed down through the core-expander and the core. This expander and the upper joint-former v are similar in their offices to the combined joint-former and core-expander just described, except that they are not made in one piece, and the upper joint-former v has an orifice, x, of the same shape as the core, which it surrounds and passes closely down around the core its whole length, if desired. Elevations upon one joint-former oppose depressions on the other and opposite one, so that the joints of pipe, when made, will fit together.

Upon the bed or bottom of the frame A a carriage may be placed, as shown at y, movable upon a pivot, z, over a large segment of a circle, and this, in conjunction with the slide $a'$ upon the top of said carriage, renders the carriage fully adjustable, so that any part of the work may be brought under the tamping device.

I would here call attention to the mold to be used in that modification of my machine intended for making artificial-stone building-blocks. In the drawing it is shown (as at $b'$, Fig. 6) in the form of a rectangular parallelogram; but it may be modified to form differently-shaped blocks. It is constructed with the side pieces $c'$ $c'$, having at their ends the slots $e'$ $e'$ to admit the cross-bars $f'$ $f'$, which said cross-bars have pins running through them near their ends, to bind the two sides of the mold together, the ends of the said side pieces $c'$ $c'$ being made inclined on the outside so that when the ends are driven down they bring the sides together with a very considerable pressure, said pressure being resisted by cross-bars $g'$ $g'$ extending across between the said sides, the ends of the cross-bars being let into gains to hold them firmly in their places, which firmness is necessary from the fact that they form the ends of the mold which shapes the block of stone.

I have herein described two modifications of my machine—one for the manufacture of pipe, for any purpose, of artificial stone, the other for the manufacture of building-blocks of the same material; but it is obvious that the same principles and substantially the same machine, also, may be used for a variety of useful purposes where a percussive force is desired at different elevations during a continuous operation or otherwise. In the modifications here shown, or in others, the machine may be mounted upon wheels, so that it can be moved about. Other mechanism might be used—for instance, levers placed at an angle with the line of the rod a, or ratchets operated by springs—to perform the same office as the rollers i i; but the rollers are considered preferable. At Fig. 15 is shown my improved pipe-joint, (as produced by my improved joint-forming mold,) consisting of sets or rows of projections $i'$ and recesses $j'$, alternately. These are so arranged that the projections on one end of a piece of pipe will fit into the recesses on the next contiguous end, and thus form a complete and tight joint. My improved tamping device can be used with great facility in forming elbow-joints. One arm of the pipe is first formed in its mold or flask, and there is then bolted to the flask at any desired angle the other arm of the elbow, the two matching in a diagonal line, like ordinary stove-pipe elbows, and the pipe which forms the first arm of the elbow is finished with the mitered end. The flask which has thus been bolted to the portion first filled is then placed in a vertical position and also filled with cement or artificial-stone composition and tamped by the same process. Thus a solid and entire elbow-joint is formed in a flask of that shape. A joint for a branch pipe can also be made by a similar process by the use of a mold of the proper form for the purpose, and tamped by the same process, as in the case of the elbow-joint.

What I claim as my invention, and desire to secure by Letters Patent, is—

1. The jointed or hinged rotary tamping device, operated with or without a spring, $f$, in order to manufacture artificial-stone pipe of an irregular form, substantially as described.

2. A movable or pivoted foot, n, to conform to any desired form of core, of case, or aperture of pipe, in the manufacture of artificial-stone pipe of irregular form, as herein described.

3. The combination of the shaft a, lever b, adjustable feed, consisting of the plate D and pawl k, operating as herein described, in order to effect a uniformity of percussion upon all portions of the manufactured article, as herein described.

4. The combination of the cam g, lever b, shaft a, adjustable feed D and K, with a percussive, compacting, or tamping device, so arranged as to rotate with the shaft a, substantially as herein described.

5. The device B, having the rolls i i and pins j j to bind or hold and release the shaft a when raised by the lever b, substantially as herein described.

6. The combination of the shaft a, operated as herein described, with the cam or roller l, to regulate the height from which the said shaft shall descend when striking a blow, and also to effect the striking of blows of the same intensity, but at different heights above the bed.

7. The outer case or mold, having the hinges, the handles *w*, or the plate *p* to cover the joint at the point where the case opens, and the latches *o*, constructed and operated as herein described.

8. The expanding devices *u* and *t*, in combination with the screw-rod, substantially as herein described.

9. The joint-forming molds, constructed as herein described, and employed in combination with a case and core, as shown at *t* and *s*, Fig. 10.

10. The pipe-joint, constructed with the projections and recesses, and the same being so arranged that the projections upon one end of a piece of pipe shall fit the recesses upon the other, and vice versa, as shown in Fig. 15.

JOHN W. STOCKWELL.

Witnesses:
D. W. SCRIBNER,
F. E. JORDAN.